United States Patent

[11] 3,594,661

| [72] | Inventor | Maurice Roulot<br>Orsay, France |
|---|---|---|
| [21] | Appl. No. | 779,513 |
| [22] | Filed | Nov. 27, 1968 |
| [45] | Patented | July 20, 1971 |
| [73] | Assignee | Compagnie Generale D'Electricite<br>Paris, France |
| [32] | Priority | Nov. 30, 1967 |
| [33] | | France |
| [31] | | PV 130,482 |

[54] GAS LASER TUBE
1 Claim, 2 Drawing Figs.

| [52] | U.S. Cl. | 331/94.5 |
|---|---|---|
| [51] | Int. Cl. | H01s 3/02 |
| [50] | Field of Search | 331/94.5 |

[56] References Cited
UNITED STATES PATENTS
3,493,888  2/1970  Jackson  331/94.5

*Primary Examiner*—Roy Lake
*Assistant Examiner*—Darwin R. Hostetter
*Attorney*—Sughrue, Rothwell, Mion, Zinn & Macpeak ABSTRACT: A gas laser comprises an outer tube and a plurality of graphic and ceramic rings placed inside the tube. The rings are in the form of a stack which is blocked on one end by lugs welded to the inner surface of the tube. The other end of the stack emerges into a free space formed by an enlarged area arranged in the inner surface of the tube and is held by a disc which is biased against lugs placed on the inner surface of the enlargement.

PATENTED JUL20 1971 3,594,661

GAS LASER TUBE

The present invention relates to gas lasers and has for its object an improvement in gas lasers comprising graphite and ceramic rings in juxtaposition inside the tube for establishing a thermal insulation between the walls of the tube and the gaseous medium with which tube is filled and the temperature of which gaseous medium can reach several hundreds of degrees.

Generally speaking, in such lasers, a ceramic ring is disposed between two graphite rings, these latter rings being such that the ratio L/D is smaller than 5, L being the axial thickness of the ring and D the internal diameter of the ring, this latter diameter being of the order of a few millimeters. The ratio L/D must be sufficient to avoid producing an electric discharge at the level of the ring.

The stacking of all of the graphite and ceramic rings is effected in the cold state, which makes it necessary to provide an expansion joint, the dimensions of which have to be calculated with high accuracy.

If the dimensions of this joint are too small, the heat present when the laser is excited may cause expansion of the rings, thus setting up constraining forces on the lugs which lock the rings resulting in a deterioration of the laser tube.

If the dimensions of the joint are too large, there is the danger that one of the ceramic rings will be positioned crosswise in the tube, thus cutting off the laser beam inside the resonant cavity; in this case, it is difficult for the ring to be replaced in the proper position.

Previously, these laser tubes have been permanently mounted and the locking lugs have been made by directly welding a piece of glass on the internal wall of the laser tube.

The present invention has for its object the elimination of the disadvantages present in the prior art lasers as described above.

The present invention is concerned with an improvement in laser tubes which comprise graphite and ceramic rings in juxtaposed relation. The laser tube is particularly characterized in that it has, at one of its ends, a device permitting the alteration of the rings without interfering with the geometrical shape of the laser tube.

According to another feature of the present invention, the aforesaid device comprises a disc, capable of being held in one of the ends of the laser tube, the locking of the disc being effected by a spring which biases the disc against lugs or abutments.

Other features and advantages of the present invention will become apparent from the following description and by reference to the accompanying drawings, wherein.

Figure 1:
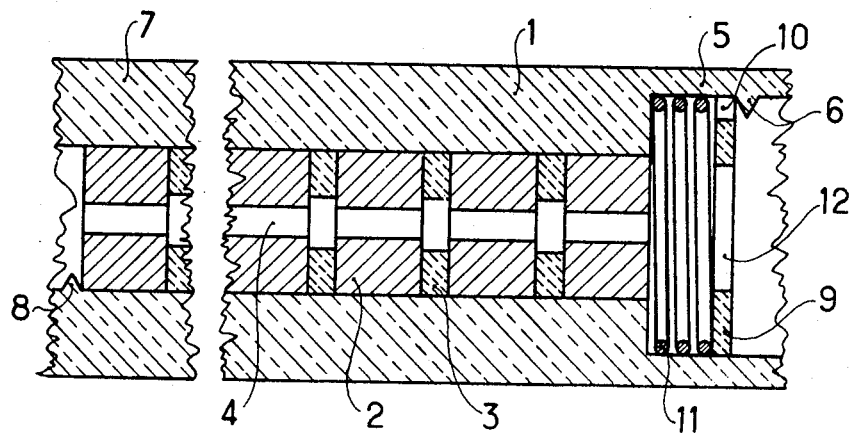
FIG. 1 represents a sectional view of the middle portion of a laser tube with the device according to the invention.

As shown in FIG. 1, the interior of the middle portion 1 of the laser tube comprises a succession of graphite rings 2 and ceramic rings 3, which are hollow at their center so as to form a capillary 4 in which the plasma is established when the laser is excited.

At the end 5, for example, the tube has a bell mouth, the diameter of which is larger than the internal diameter of the tube 1. The internal face of this mouth carries quartz lugs 6, which are, for example, three in number and which are respectively disposed on the apices of an equilateral triangle.

The end 7 of the middle portion 1 of the tube also has lugs 8 similar to the lugs 6, but disposed on the internal surface of the tube 1 and not on the internal surface of a mouth.

Figure 2:
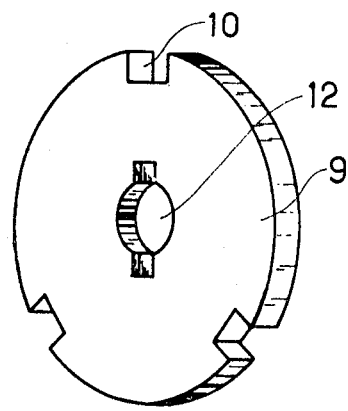
FIG. 2 represents a perspective view of one of the elements of the device according to the invention.

The rings 2 and 3 are threaded into the tube through the end 5, and are locked by the lugs at the end 7. When the number of rings necessary for completely lining the tube from the end 7 to the end 5 is reached, the tube is closed by a disc 9 such as that shown in FIG. 2. The disc 9 has a central hole 12, the diameter of which is slightly smaller than the external diameter of the rings 2 and 3 and has notches 10 in a number equal to that of the lugs 6. The locking of the disc 9 against the studs is effected by a spring 11, which bears against a wall of the end 5. The disc 9 and also the spring 11 can, for example, be made of quartz.

On heating, the stack 2 and 3 expands and the space contained between the last graphite ring and the disc 9, which is bearing against the lug 6, forms an expansion joint which permits the expansion of the stack.

The wall of the end 5 of the laser tube is thinner than the wall of the remainder of the tube, thus the laser can be equipped with a device by which this end 5 can be cooled, for example, with water. It is obvious that the numerous variants and modifications of the arrangement which has just been described above simply by way of illustration can be made without departing from the scope of the present invention.

What I claim is:
1. A gas laser structure comprising:
   a tube having a first inner channel,
   a plurality of graphite and ceramic rings alternatively disposed in said first channel,
   a first set of lugs welded to the surface of said first channel and forming first stop means for said rings at one end of said tube,
   a second inner channel extending outwardly of said first channel at the other end of said tube and having a diameter larger than the outer diameter of said rings,
   a second set of lugs welded to the surface of said second channel and having a height smaller than the difference between the inner diameter of said second channel and the outer diameter of said rings,
   second stop means for said rings comprising a disc engaging said second set of lugs, having a central hole the diameter of which is smaller than the outer diameter of said rings and notches on the periphery of said disc for permitting the passage of said disc over said lugs,
   and a spring disposed between said disc and a shoulder machined in the end of said tube substantially at the end of the portion of the tube comprising said first channel for resiliently blocking said disc against said second set of lugs after angular shifting of the same subsequent to movement of said disc past said second set of lugs.